(12) United States Patent
Khan et al.

(10) Patent No.: US 9,699,112 B2
(45) Date of Patent: Jul. 4, 2017

(54) EFFICIENT ALLOCATION OF NETWORK RESOURCES

(71) Applicant: Comcast Cable Communications, LLC, Philadelphia, PA (US)

(72) Inventors: Sohel Khan, Philadelphia, PA (US); Jon Allen Boone, Coatesville, PA (US)

(73) Assignee: Comcast Cable Communications, LLC, Phialdelphia, PA (US)

( * ) Notice: Subject to any disclaimer, the term of this patent is extended or adjusted under 35 U.S.C. 154(b) by 0 days.

(21) Appl. No.: 14/823,537

(22) Filed: Aug. 11, 2015

(65) Prior Publication Data
US 2016/0043966 A1 Feb. 11, 2016

Related U.S. Application Data

(63) Continuation of application No. 13/740,853, filed on Jan. 14, 2013, now Pat. No. 9,137,169.

(51) Int. Cl.
| | |
|---|---|
| *H04L 12/56* | (2006.01) |
| *H04L 12/927* | (2013.01) |
| *H04L 12/911* | (2013.01) |
| *H04L 29/06* | (2006.01) |
| *G06F 15/173* | (2006.01) |

(52) U.S. Cl.
CPC ............ *H04L 47/803* (2013.01); *H04L 47/70* (2013.01); *H04L 69/24* (2013.01)

(58) Field of Classification Search
USPC ....... 709/226, 238, 220, 221, 229, 246, 217, 709/224, 228
See application file for complete search history.

(56) References Cited

U.S. PATENT DOCUMENTS

| | | | | |
|---|---|---|---|---|
| 7,031,747 | B2* | 4/2006 | Cyr | ....................... H04W 76/02 370/352 |
| 8,774,728 | B2* | 7/2014 | Berens | ......................... 342/372 |
| 8,868,785 | B1* | 10/2014 | Umapathy | ........ G06F 17/30905 709/217 |
| 9,137,169 | B2* | 9/2015 | Khan | ...................... H04L 69/24 |
| 2002/0174228 | A1* | 11/2002 | Kanemaki | ........... H04L 12/5695 709/226 |
| 2007/0123238 | A1* | 5/2007 | Jagadeesan | ....... H04M 3/42246 455/415 |
| 2008/0137650 | A1* | 6/2008 | Kumarasamy | .......... H04L 12/66 370/356 |
| 2008/0158336 | A1* | 7/2008 | Benson | ................. H04L 65/602 348/14.08 |
| 2008/0297415 | A1* | 12/2008 | Berens | ................... H04J 11/003 342/372 |
| 2012/0033661 | A1* | 2/2012 | Knappe | ............... H04M 1/2535 370/352 |
| 2012/0082038 | A1* | 4/2012 | Xu | ....................... H04J 11/0023 370/244 |

* cited by examiner

*Primary Examiner* — Jude Jean Gilles

(74) *Attorney, Agent, or Firm* — Ballard Spahr LLP

(57) ABSTRACT

Using information for efficient allocation of network resources, such as for a communication session, is disclosed. The methods and systems can utilize one or more identifiers that can be configured to indicate the presence of one or more supported features, along with an indication of whether the supported feature is required for communication.

20 Claims, 8 Drawing Sheets

EFFICIENT ALLOCATION OF NETWORK RESOURCES

CROSS REFERENCE TO RELATED APPLICATION

This application is a Continuation of U.S. Non-Provisional application Ser. No. 13/740,853 filed Jan. 14, 2013, herein incorporated by reference in its entirety.

BACKGROUND

Communication protocols, such as Session Description Protocols (SDP), typically allow for the inclusion of a parameter to indicate that a device is capable of supporting a feature associated with communication (e.g., bandwidth, encoding, etc.). In response to such information, a communication function of a network can allocate network resources to ensure that a device can utilize certain communication features required for communication. Sometimes reservation of network resources is performed but the resources are not used. Such unnecessary reservations (e.g., allocation for potential use) of network resources cause resource constraints resulting in reduced capacity of network functions.

SUMMARY

It is to be understood that this summary is not an extensive overview of the disclosure. This summary is illustrative and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In an aspect, provided are methods and systems comprising receiving, at a first network node, a message having an offer describing session capabilities and requirements during a session negotiation associated with an interactive multimedia session. The methods and systems can comprise adding to the message, by the first network node, an attribute indicative of an operational requirement of a computing device that enables, at least in part, the interactive multimedia session.

In a further aspect, provided are methods and systems comprising analyzing, at a first network node, a session description message associated with a communication session. The methods and systems can determine when the session description message has an attribute indicative of an operational requirement of a computing device that is part of the communication session and can allocate, by the first network node, a first communication resource to the communication session according to the attribute.

In a still further aspect, an apparatus is provided comprising a memory having computer-executable instructions encoded thereon, and a processor functionally coupled to the memory and configured, by the computer-executable instructions, to receive a session description message associated with a communication session. The apparatus can be configure to add an attribute to the session description message indicative of an operational requirement of a computing device that enables, at least in part, the communication session.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1A:
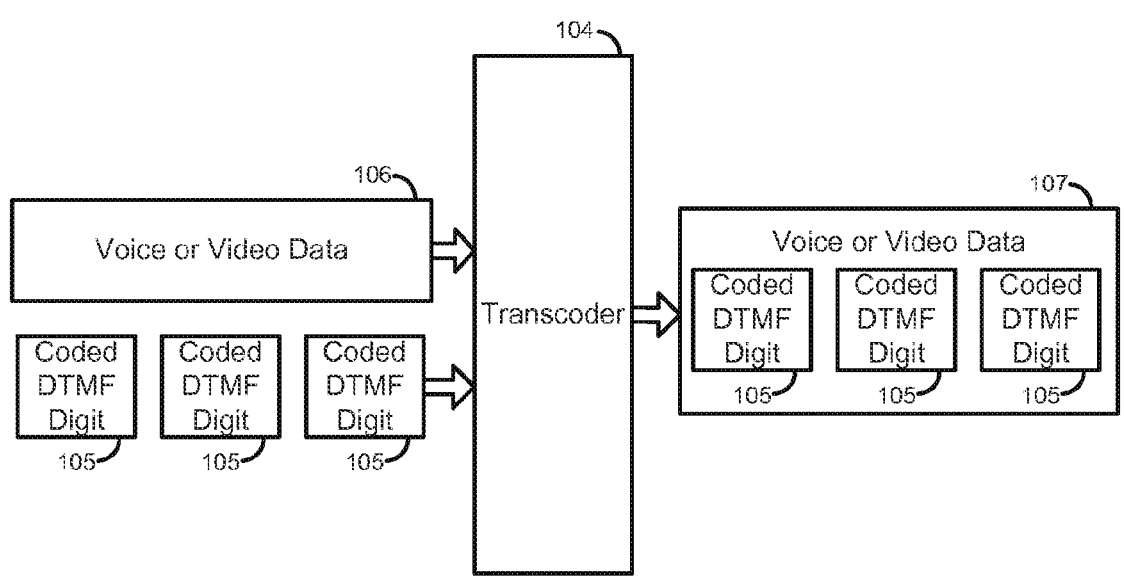
FIG. 1a illustrates an example communication scheme in accordance with one or more aspects of the disclosure.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be readily appreciated, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As utilized in this specification and the annexed drawings, the terms "system," "component," "unit," "interface," "platform," "node," "function," "device," and the like are intended to include a computer-related entity or an entity related to an operational apparatus with one or more specific functionalities, wherein the computer-related entity or the entity related to the operational apparatus can be either hardware, a combination of hardware and software, software, or software in execution. Such entities also are referred to as "functional elements." As an example, a unit can be, but is not limited to being, a process running on a processor, a processor, an object (metadata object, data object, signaling object), an executable computer program, a thread of execution, a program, a memory (e.g., a hard-disc drive), and/or a computer. As another example, a unit can be an apparatus with specific functionality provided by mechanical parts operated by electric or electronic circuitry which is operated by a software application or a firmware application executed by a processor, wherein the processor can be internal or external to the apparatus and can execute at least a portion of the software application or the firmware application. As yet another example, a unit can be an apparatus that provides specific functionality through electronic functional elements without mechanical parts, the electronic functional elements can include a processor therein to execute software or firmware that provides, at least in part, the functionality of the electronic functional elements. The foregoing examples and related illustrations are but a few examples and are not intended to be limiting. In addition, while such illustrations are presented for a unit, the foregoing examples also apply to a node, a function, a controller, a component, a system, a platform, and the like. It is noted that in certain embodiments, or in connection with certain aspects or features such embodiments, the terms "unit," "component," "system," "interface." "platform" "node," "function," "device," can be utilized interchangeably.

Throughout the description and claims of this specification, the words "comprise," "include," and "have" and their variations, such as "comprising" and "comprises," "including" and "includes," "having" and "has," mean "including but not limited to," and are not intended to exclude, for example, other units, nodes, components, functions, interfaces, actions, steps, or the like. "Exemplary" means "an example of" and is not intended to convey an indication of a preferred or ideal embodiment. "Such as" is not used in a restrictive sense, but for explanatory purposes.

Interactive voice response (IVR) is a technology that automates the personal interaction of telephone callers with the computerized phone system. IVR systems can utilize voice recorded prompts and menus to present information to callers. Touch-tone telephone keypad entries are gathered from the caller to collect information and to provide navigation through simple to complex IVR menu structures. One of the means used to process user requests and to route phone calls is phone keypad entries entered by the user. These entered key codes are referred to as Dual-Tone Multi-Frequency (DTMF) signals. DTMF is used for telecommunication signaling over analog telephone lines in the voice-frequency band between telephone handsets and other communications devices and the switching center.

The present disclosure recognizes and addresses, in one aspect, the issue of absence of communication protocols that can indicate whether supporting features for communication actually need to be used in a communication session (e.g., an interactive multimedia session). For example, a conventional communication protocol utilized for a communication session comprising an intermediary function that transcodes out-of-band DTMF signaling to in-band DTMF signaling or in-band DTMF signaling to out-of-band DTMF signaling typically indicates whether the end devices in the multimedia communication are DTMF capable or not. Thus, in such scenario, the intermediary function pre-emptively allocates resources for transcoding in the event that end devices are DTMF capable. However, although an end device may be DTMF capable, the end device may not actually use DTMF during the multimedia session. Consequently, the pre-emptive reservation of transcoding resources causes resource constraints, resulting in reduced number of simultaneous sessions that can be supported by the transcoding function of an intermediary network device.

The present disclosure relates to methods and systems configured to allocate network resources efficiently. In particular, yet not exclusively, the methods and systems provided can utilize bypassing of the transcoding function of an intermediary network device to prevent resource constraints when DTMF transcoding is not needed (although supported) and can utilize the transcoding function of an intermediary network device to transcode from in-band to out-of-band or out-of-band to in-band. Those skilled in the art will appreciate that present methods may be used in systems that employ both digital and analog equipment. One skilled in the art will appreciate that provided herein is a functional description and that the respective functions can be performed by software, hardware, or a combination of software and hardware.

FIG. 1a illustrates out-of-band signaling and in-band signaling with regard to DTMF. In an aspect, out-of-band signaling occurs in a DTMF context when one or more coded DTMF digits 105 are transmitted separately (e.g., as RTP/IP event packets) from associated coded voice or video data 106 (e.g., as RTP/IP packets). A transcoder 104 can receive both the coded DTMF digits 105 and the coded voice or video data 106 and output coded voice or video data 107 with the coded DTMF digits 105 embedded in the coded voice or video data 107 (e.g., combined into RTP/IP Packets). If neither of two communicating devices is an IVR system, no DTMF signaling is used, as neither device requires DTMF. In the event at least one of two communicating devices is an IVR system, DTMF signals will be sent either out-of-band or in-band (according to the configuration of each device) during a communication session between the two communicating devices. If both of the communicating devices operate according to the same band, there is no need for transcoding (e.g, in-band to in-band, out-of-band to out-of-band).

FIG. 1a illustrates a communication session between two communicating devices, wherein one device is an IVR system that requires DTMF signaling. FIG. 1a illustrates a mismatch between signaling configurations between the two communicating devices (e.g., out-of-band to in-band). Thus, the communication in FIG. 1a illustrates the transcoding flow between out-of-band and in-band signaling. IVR systems can either be in-band or out-of-band. Accordingly, systems must be able to transcode in either direction. The methods and systems provided enable the provisioning, or lack thereof, of DTMF transcoding functionality even in the case of two communicating devices wherein at least one device is an IVR system and the two communicating devices are configured to communicate according to different bands.

Figure 1B:
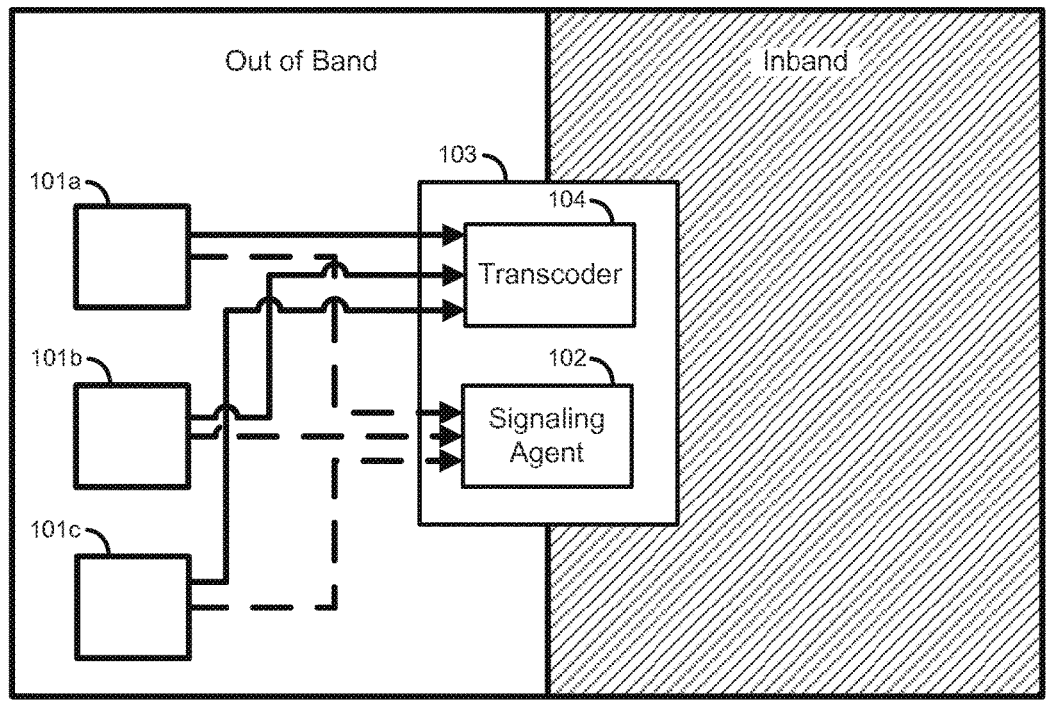
FIG. 1b illustrates another example communication scheme in accordance with one or more aspects of the disclosure.
Figure 1C:
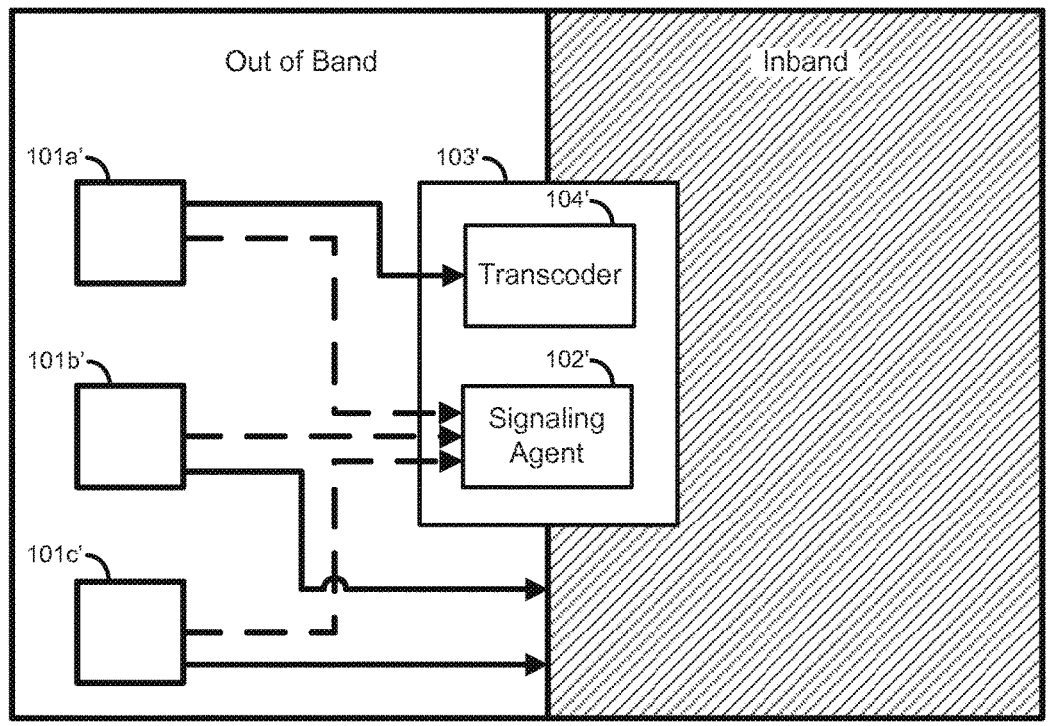
FIG. 1c illustrates another example communication scheme in accordance with one or more aspects of the disclosure.

FIG. 1b and FIG. 1c illustrate various aspects of an exemplary system in which the present methods and systems can operate. In particular, FIG. 1b illustrates a communication system with multiple communication devices 101a, 101b, 101c. The communication devices 101a, 101b, 101c can be any type of communication device; for example, a computing device, a telephone, a video phone, a set top box, a smart phone, and the like. The communication devices 101a, 101b, 101c can be configured to utilize out of band and/or in-band communications. For example, out-of-band communication can comprise information exchange in a band separate from the band utilized for a voice, video, and data stream, or in some aspects, in an entirely separate dedicated channel or separate data flow/events; whereas, in-band communication, for example, can comprise information (e.g., DTMF) exchange within the same band, channel, or flow/events used for voice/video.

FIG. 1b illustrates communication paths with solid and dashed lines. A dashed line indicates a signaling communication whereas a solid line indicates voice, data, video, or media streams. Each of communication devices 101a, 101b, 101c can be configured to provide signaling data to a signaling agent 102 of communications server 103. In an aspect, communication server 103 can be a session border controller (SBC) containing transcoding function. For example, signaling agent 102 can be specialized hardware and/or software configured as part of an SBC that can be configured to process signaling for setting up, conducting, and tearing down telephone calls or other interactive media communications. The signaling agent 102 can process signals according to one or more protocols; for example, the Session Description Protocol (SDP). SDP is a format for describing streaming media initialization parameters. SDP is intended for describing multimedia communication sessions for the purposes of session announcement, session invitation, and parameter negotiation. SDP does not deliver media itself, but is used for negotiation between end points of media type, format, and associated properties.

In an aspect, an SDP message can be configured to indicate whether DTMF signaling is supported by a particular communication device 101a, 101b, 101c. In an aspect, if an SDP signal received by the signaling agent 102 indicates support for DTMF then the communications server 103 can allocate resources to support DTMF, for example, transcoder 104. Transcoding is the ability to convert between media streams that are based upon disparate codecs. In an aspect, an audio stream comprising in-band DTMF tones can be converted by the transcoder 104 into data-based events and vice-versa.

As shown in FIG. 1b each communication device 101a, 101b, 101c is passing an SDP message (dashed lines) to the signaling agent 102 of communications server 103. The SDP messages can indicate that each communication device 101a, 101b, 101c supports one or more features, the use of which requires transcoder 104. In another aspect, the communications server 103 can identify one or more features supported by each communication device 101a, 101b, 101c and can append the list of supported features to each of the respective communication devices' SDP messages. For example, one or more of communication device 101a, 101b, 101c can be configured to support DTMF regardless of whether devices are IVRs or not; thus, either requiring or not requiring the use of transcoder. Thus, FIG. 1b illustrates each media stream (solid lines) from each communication device 101a, 101b, 101c being received by the transcoder 104 of communications server 103. Each media stream received can then be processed by the transcoder 104 and passed along the communication network to one or more intermediary communication servers (not shown) and/or a destination communication device (not shown).

FIG. 1c illustrates another exemplary network for implementing the methods and systems provided and shares similar components described in FIG. 1b, identified using the same numeric identifier with the addition of a prime ('). The communication paths in FIG. 1c differ from those of FIG. 1b, as only the media stream from communication device 101a' is provided to transcoder 104'. Media streams originating from communication devices 101b' and 101c' are communicating directly to the network without the use of the transcoder 104'. In this aspect, the SDP messages provided by each of the communication devices 101a', 101b', 101c' indicate that each communication device 101a', 101b', 101c' supports one or more features, the use of which requires transcoder 104'. However, the SDP message can be further configured to indicate whether or not the feature is required for communication. For example, communication device 101a' can be an interactive voice response (IVR) system that supports the use of DTMF and also requires the use of DTMF. Communication device 101b' can be a system that supports DTMF, but the use of DTMF is not required. Thus the media stream from 101a' can be provided to the transcoder 104' while the media stream from 101b' can be provided directly to the network, skipping the use of transcoder 104' and conserving network resources. In another aspect, the communications server 103' can identify one or more features supported, and whether or not one or more of the features is required, by each communication device 101a, 101b, 101c and can append the list of supported features along with an indicator reflecting requirement status to each of the respective communication devices' SDP messages.

In the specific case of SDP, the methods provided can add an attribute that provides a positive indicator that an end device (e.g., IVR) requires DTMF for successful operation. On the other hand, presence of a negative indicator can signal that the end device shall not use DTMF during the call. For backward compatibility, absence of any indicator (positive or negative) can mean that a positive indicator is assumed.

For example, an SDP media line indicating support for telephone-events can be configured as:
  m=audio 35456 RTP/AVP 0 101
  a=rtpmap: 101 telephone-event/8000
  a=fmtp:101 0-15

This can indicate that the endpoint sending the SDP message supports PCMU and telephone-events 0-15.

In the specific case of SDP, the methods and systems provided can implement an additional parameter in the fmtp section for a device that requires DTMF to successfully operate:
  m=audio 35456 RTP/AVP 0 101
  a=rtpmap: 101 telephone-event/8000
  a=fmtp:101 0-15; dtmf-req=yes
  On the other hand, an endpoint that does not require DTMF to successfully operate would send:
  m=audio 35456 RTP/AVP 0 101
  a=rtpmap: 101 telephone-event/8000
  a=fmtp:101 0-15; dtmf-req=no For backward compatibility, absence of the dtmf-req parameter can cause the endpoint receiving the SDP to assume that a positive indicator had been received.

Figure 2:
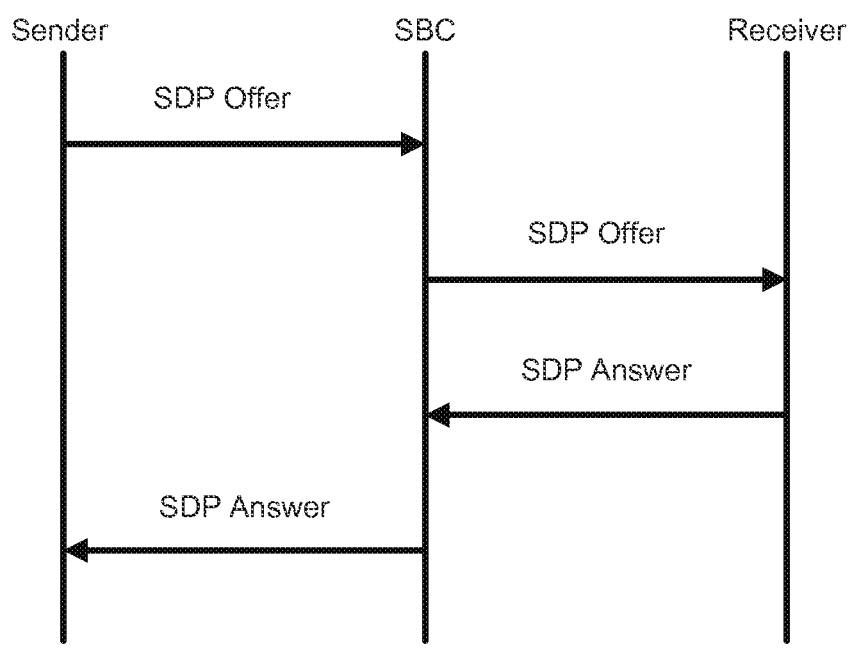
FIG. 2 illustrates an example call flow in accordance with one or more aspects of the disclosure.

FIG. 2 illustrates an example signaling flow in the case of establishing communication in accordance with one or more aspects of the disclosure. The methods and systems can be applied to all types of communication, for example, telephonic, data, video, and the like. A sender can utilize a first communication device, sender device, to initiate communication with a second communication device, receiver device. The first communication device can contact a communication server or an intermediary function, for example a session border controller (SBC), and provide the communication server or intermediary function with a message, such as an SDP offer message. The SDP offer message can comprise information such as an identifier (e.g., an object, such as a metadata object) for the second communication device, the type of communication desired, and a list of one or more features supported by the first communication device. The list of supported feature(s) can further comprise an identifier (e.g. metadata, such as a specific tag, a field, a hypermedia node, a link, or the like) indicating whether one or more supported features are required features. In one implementation, the communication server or the intermediary function (e.g., the SBC) can dedicate system resources accordingly and relay the SDP offer message to the second communication device (e.g., the callee device). The second communication device can respond with a message, such as an SDP answer message. In certain implementations, the SDP answer message can comprise a list of features supported by the second communication device and an identifier (e.g., metadata, such as a specific tag, a field, a hypermedia node, a link, or the like) indicating whether one or more supported features are required features. The communication server or intermediary function (e.g., the SBC) can dedicate system resources accordingly and relay the SDP answer message to the first communication device (the sender device). In another aspect, the communication server can append to any message one or both of the list of supported features and an identifier indicating which features are required for communication.

Figure 3:
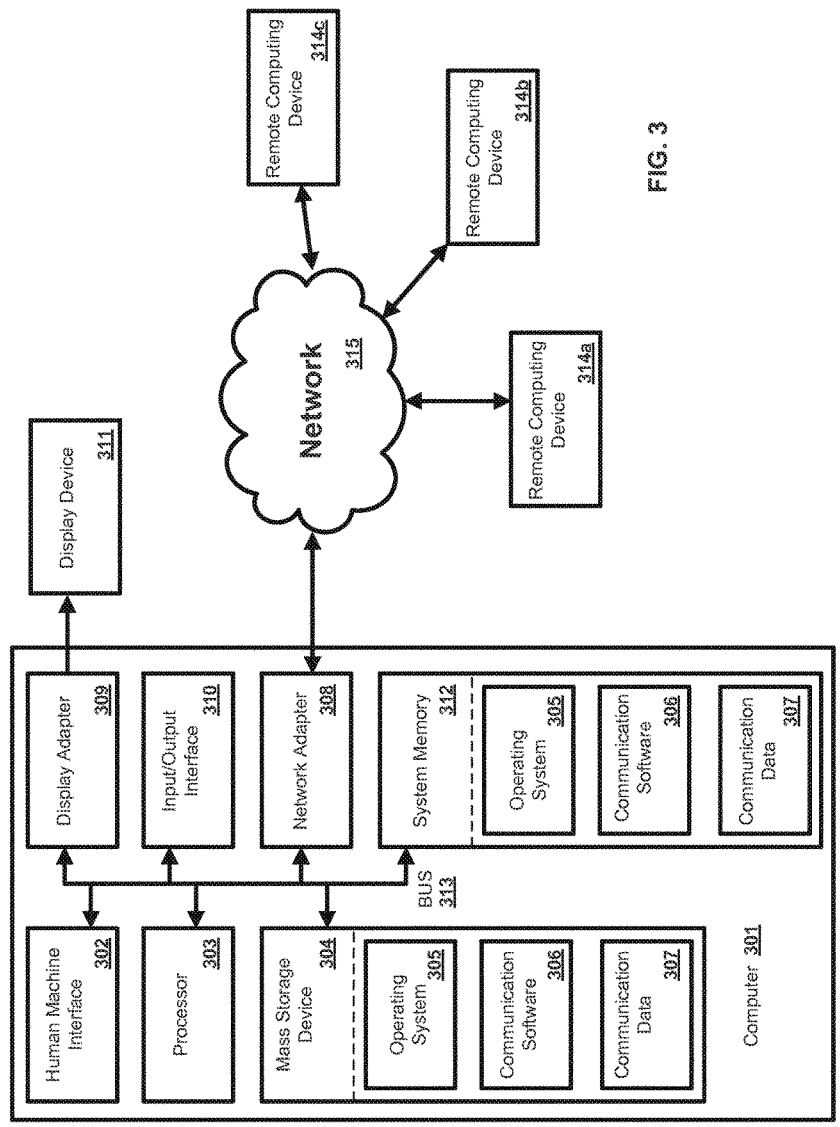
FIG. 3 is an example operating environment in accordance with one or more aspects of the disclosure.

In an exemplary aspect, one or more steps and/or components of the methods and systems can be implemented on a computing device 301 as illustrated in FIG. 3 and described below. By way of example, communication servers 103 and/or 103' of FIG. 1b and FIG. 1c, respectively, and/or communication devices 101a, 101b, 101c and/or 101a', 101b', 101c' of FIG. 1b and FIG. 1c, respectively, can be a computing device as illustrated in FIG. 3. Similarly, the methods and systems disclosed can utilize one or more computers to perform one or more functions in one or more locations. FIG. 3 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 301. The components of the computer 301 can comprise, but are not limited to, one or more processors or processing units 303, a system memory 312, and a system bus 313 that couples various system components including the processor 303 to the system memory 312. In the case of multiple processing units 303, the system can utilize parallel computing.

The system bus 313 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 313, and all buses specified in this description can also be implemented over a wired or wireless network connection and each of the subsystems, including the processor 303, a mass storage device 304, an operating system 305, communication software 306, communication data 307, a network adapter 308, system memory 312, an Input/Output Interface 310, a display adapter 309, a display device 311, and a human machine interface 302, can be contained within one or more remote computing devices 314a,b,c at physically separate locations, connected through buses of this form, in effect implementing a fully distributed system.

The computer 301 typically comprises a variety of computer readable media. Exemplary readable media can be any available media that is accessible by the computer 301 and comprises, for example and not meant to be limiting, both volatile and non-volatile media, removable and non-removable media. The system memory 312 comprises computer readable media in the form of volatile memory, such as random access memory (RAM), and/or non-volatile memory, such as read only memory (ROM). The system memory 312 typically contains data such as communication data 307 and/or program modules such as operating system 305 and communication software 306 that are immediately accessible to and/or are presently operated on by the processing unit 303.

In another aspect, the computer 301 can also comprise other removable/non-removable, volatile/non-volatile computer storage media. By way of example, FIG. 3 illustrates a mass storage device 304 which can provide non-volatile storage of computer code, computer readable instructions, data structures, program modules, and other data for the computer 301. For example and not meant to be limiting, a mass storage device 304 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 304, including by way of example, an operating system 305 and communication software 306. Each of the operating system 305 and communication software 306 (or some combination thereof) can comprise elements of the programming and the communication software 306. Communication data 307 can also be stored on the mass storage device 304. Communication data 307 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 301 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 303 via a human machine interface 302 that is coupled to the system bus 313, but can be connected by other interface and bus structures, such as a parallel port, game port, an IEEE 1394 Port (also known as a Firewire port), a serial port, or a universal serial bus (USB).

In yet another aspect, a display device 311 can also be connected to the system bus 313 via an interface, such as a display adapter 309. It is contemplated that the computer 301 can have more than one display adapter 309 and the computer 301 can have more than one display device 311. For example, a display device can be a monitor, an LCD (Liquid Crystal Display), or a projector. In addition to the display device 311, other output peripheral devices can comprise components such as speakers (not shown) and a printer (not shown) which can be connected to the computer 301 via Input/Output Interface 310. Any step and/or result of the methods can be output in any form to an output device. Such output can be any form of visual representation, including, but not limited to, textual, graphical, animation, audio, tactile, and the like. The display 311 and computer 301 can be part of one device, or separate devices.

The computer 301 can operate in a networked environment using logical connections to one or more remote computing devices 314a,b,c. By way of example, a remote computing device can be a personal computer, portable computer, smartphone, a server, a router, a network computer, a peer device or other common network node, and so on. Logical connections between the computer 301 and a remote computing device 314a,b,c can be made via a network 315, such as a local area network (LAN) and/or a general wide area network (WAN). Such network connections can be through a network adapter 308. A network adapter 308 can be implemented in both wired and wireless environments. Such networking environments are conventional and commonplace in dwellings, offices, enterprise-wide computer networks, intranets, and the Internet.

For purposes of illustration, application programs and other executable program components such as the operating system 305 are illustrated herein as discrete blocks, although it is recognized that such programs and components reside at various times in different storage components of the computing device 301, and are executed by the data processor(s) of the computer. An implementation of communication software 306 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 4:
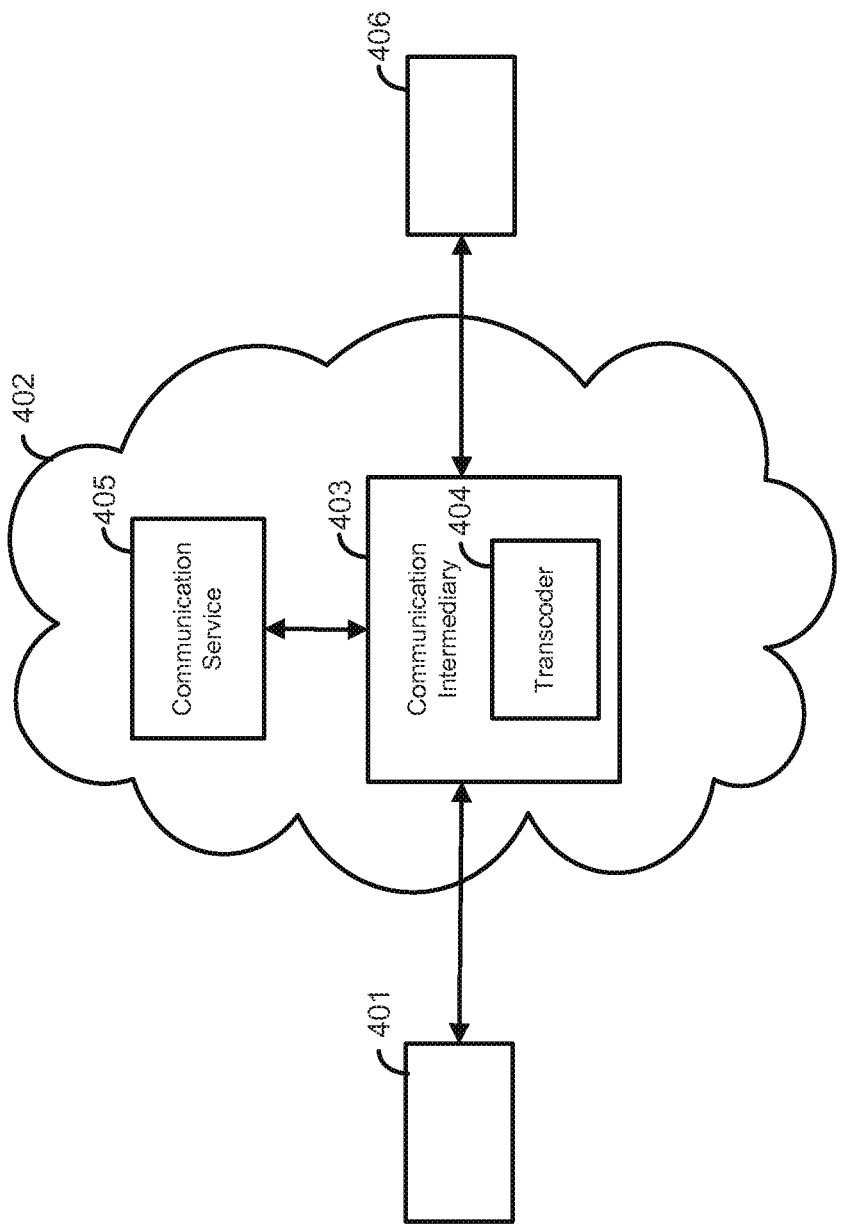
FIG. 4 is another example operating environment in accordance with one or more aspects of the disclosure.

FIG. 4 illustrates another exemplary operating environment. Devices 401 and 406 can be any type of communication device configured for media communications (e.g. audio, video, data, and combination thereof). Devices 401 and 406 can be in communication with a network 402. Network 402 can be any type of network or combination of networks that can utilize any type of communication protocol or combination of communication protocols, including, for example, packet-switching protocols (Internet protocol (IP), Simple Network Management Protocol (SNMP), Modbus, etc.) and/or circuit-switching protocols. The network 402 can be a wireless network, a wireline network, or a combination thereof, and can have various footprints (e.g., wide area network (WAN), local area network (LAN), home area network (HAN), personal area network (PAN), or the like). In an aspect, network 402 can be the Internet, an industrial automation network, a content delivery network, or the like. Devices 401 and 402 can utilize the network 402 to be in communication with a communication intermediary function 403 (also referred to as communication intermediary 403). The communication intermediary 403 can be one or more computing devices of the type described in FIG. 3. In an aspect, communication intermediary 403 can be a server or other device configured for handling incoming and outgoing media communication. The communication intermediary 403 can be configured for processing one or more signaling protocols for establishing communication between devices 401 and 406.

In certain aspects, communication between devices 401 and 406 can require the use of transcoder 404. A message can be generated (e.g., defined and/or composed) that can describe one or more features supported by one or more of the devices 401 and 406, and whether one or more of those features may be required for communication. The message can be generated at one or more of the device 401, device 406, and/or the communication intermediary 403. In another aspect, multiple messages can be created defining the various features supported and identifying the supported features. For example, an offer message and an answer message can be created wherein each message defines the various features supported and identifies the supported features for a particular device.

The communication intermediary 403 can broker communication between device 401 and device 406 by processing one or more messages and dedicating system resources accordingly. For example, communication intermediary function 403 can receive a message that indicates one or both devices 401 and 406 support the use of a feature that requires the use of transcoder 404. Yet, the message can indicate that while the feature is supported, the feature is not required. Accordingly, the communication intermediary 403 may not allocate the transcoder 404 resource to support communication between device 401 and 406. In another aspect, communication intermediary 403 can receive a message that indicates one or both devices 401 and 406 support the use of a feature that requires the use of transcoder 404. In addition or in the alternative, the message can indicate that the supported feature also is required to establish communication. Thus, the communication intermediary 403 can allocate the transcoder 404 resource to support communication between device 401 and 406.

In another aspect, one or both of devices 401 and 406 can communicate with one or more communication services 405. Communication services 405 can include, for example, unified messaging services, voicemail services, and the like. Communication between one or both of devices 401 and 406 and the communication services 405 can make use of one or more messages indicative of supported feature(s) and an identification (e.g., metadata, such as a specific tag, a field, a hypermedia node, a link, or the like) of which one of the supported feature(s) are required to permit communication and/or allocation of network resources, such as the transcoder 404.

Figure 5:
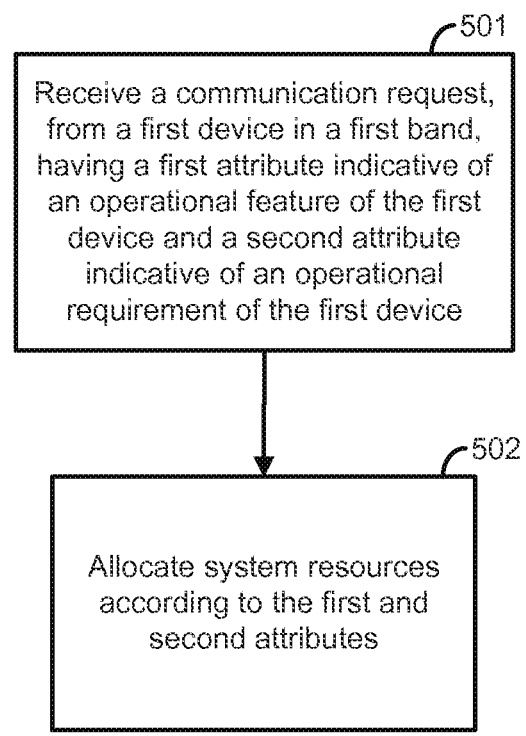
FIG. 5 is a flowchart illustrating an example method according to one or more aspects of the disclosure.

In an aspect, illustrated in FIG. 5, provided are methods comprising receiving a communication request, from a first device in a first band at 501, having a first attribute indicative of an operational feature of the first device and a second attribute indicative of an operational requirement of the first device and allocating system resources according to the first and second attributes at 502. The communication request can comprise a request to communicate with a second device in a second band. The first and second devices can be computing devices of any type, such as computers, phones, and the like. The first and second band can be either in-band or out-of-band.

The first attribute can indicate whether the first device supports dual-tone multi-frequency (DTMF) signaling. Such an indication can be used to determine whether the first device is an Interactive Voice Response (IVR) system. However, as described herein, a device that supports DTMF signaling does not necessarily require DTMF signaling for normal operations. Accordingly, the second attribute can indicate whether the first device requires dual-tone multi-frequency (DTMF) signaling.

Allocating system resources according to the first and second attributes can comprise reserving transcoder bandwidth. Allocating system resources according to the first and second attributes can also comprise transcoding from the first band to the second band if the first attribute indicates that the first device supports DTMF signaling, the second attribute indicates that DTMF signaling is required, and if the first band is different from the second band; for example, if the first band is in-band and the second band is out-of-band, or vice versa. The methods can be configured to not allocate system resources, even if the first band differs from the second band in the event DTMF signaling is not required, although supported.

Figure 6:
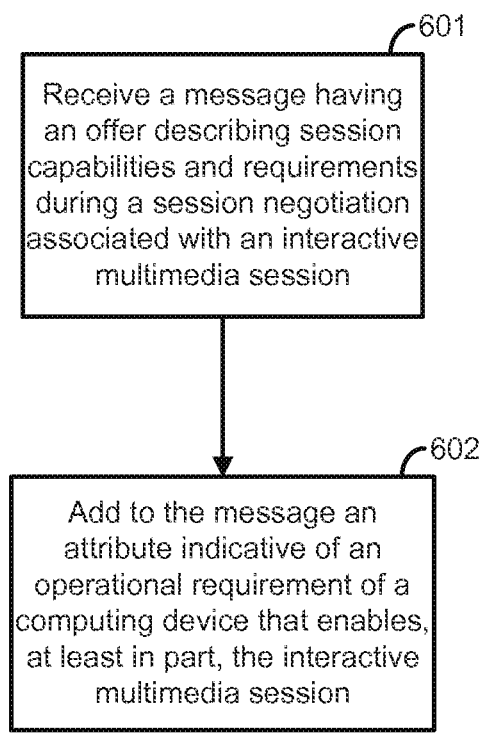
FIG. 6 is a flowchart illustrating another example method according to one or more aspects of the disclosure.

In an aspect, illustrated in FIG. 6, provided are methods and systems comprising receiving, at a first network node, a message having an offer describing session capabilities and requirements during a session negotiation associated with an interactive multimedia session at 601 and adding to the message, by the first network node, an attribute indicative of an operational requirement of a computing device that enables, at least in part, the interactive multimedia session at 602.

Adding can comprise generating the attribute to convey capability and requirements of the utilization of specially coded frequency signals either embedded inside interactive multimedia traffic or outside the multimedia traffic. In an aspect, adding can comprise generating the attribute to convey capability and requirements of not utilizing a specifically coded frequency signal either embedded inside interactive multimedia traffic or outside the multimedia traffic.

Receiving can comprise receiving an offer describing session capabilities and requirements during session negotiation. Adding can comprise adding a media-line attribute to an offer describing session capabilities and requirements during session negotiation, the media-line attribute having a value indicative of capability and requirements of specially coded frequency signals either embedded inside interactive multimedia traffic or outside the multimedia traffic by the computing device.

Adding can further comprise adding a media-line attribute to an offer describing session capabilities and/or requirements during session negotiation, the media-line attribute having a value indicative of capability and requirements of specially coded frequency signals either embedded inside interactive multimedia traffic or outside the multimedia traffic by the computing device.

Figure 7:
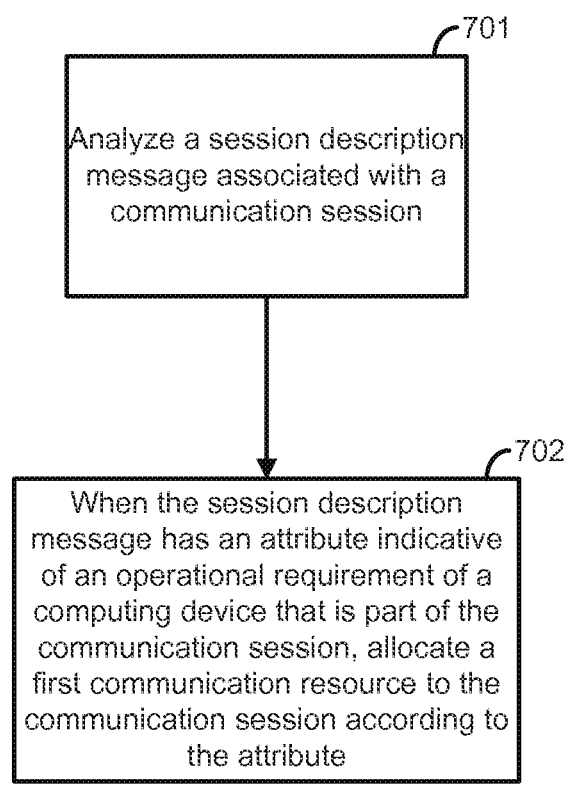
FIG. 7 is a flowchart illustrating still another example method according to one or more aspects of the disclosure.

In a further aspect, illustrated in FIG. 7, provided are methods and systems comprising analyzing, at a first network node, a session description message associated with a communication session at 701. In one aspect, in response to the analyzing, at 702, it is determined if the session description message has an attribute indicative of an operational requirement of a computing device that is part of the communication session. In the negative case, exception handling can be implemented. In the alternative, the first network node can allocate a first communication resource to the communication session according to such attribute. In an aspect, the first network node can be a session border controller. The attribute can be configured to indicate, for example, that the computing device requires Interactive Voice Response as an operational requirement. In a further aspect, the first communication resource can comprise a transcoder.

The methods can further comprise allocating, by the first network node, a second communication resource to the communication session in response to the session description message not having the attribute indicative of the operation requirement. Allocating can comprise allocating a processing resource configured to process dual-tone multi-frequency (DTMF). Analyzing can comprise decoding a session description protocol (SDP) message. In an aspect, analyzing can further comprise decoding a SDP media-line attribute in the SDP message, the media-line attribute having a value indicative of non-utilization of DTMF signaling by the computing device. Analyzing can comprise decoding a SDP media-line attribute in the SDP message, the media-line attribute having a value indicative of utilization of DTMF signaling by the computing device.

In an aspect, provided is an apparatus comprising a memory having computer-executable instructions encoded thereon and a processor functionally coupled to the memory and configured, by the computer-executable instructions to receive a session description message associated with a communication session and to add to the session description message an attribute indicative of an operational requirement of a computing device that enables, at least in part, the communication session. The apparatus can be, for example, an interactive multimedia communication function and/or node.

The processor can be further configured, by the computer-executable instructions, to generate the attribute to convey utilization of a communication resource. The processor can also be further configured, by the computer-executable instructions, to generate the attribute to convey non-utilization of a communication resource. The processor can be further configured, by the computer-executable instructions, to receive a session description protocol (SDP) message.

The processor can be further configured, by the computer-executable instructions, to add a SDP media-line attribute to the SDP message, the media-line attribute having a value indicative of utilization of DTMF by the computing device. The processor can be further configured, by the computer-executable instructions, to add a SDP media-line attribute to the SDP message, the media-line attribute having a value indicative of non-utilization of DTMF by the computing device.

The communication resource can comprise a transcoder suitable for conversion between in-band signaling and out-of-band signaling, the transcoder configured to process dual-tone multi-frequency (DTMF) signaling. The communication resource can comprise a transcoder suitable for conversion between in-band signaling and out-of-band signaling, the transcoder configured to process DTMF signaling.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving, from a first device, a message for initiating an interactive multimedia session between the first device and a second device, wherein the message comprises a first attribute indicative of an operational feature of the first device and a second attribute indicative of an operational requirement of the first device;
   determining a signaling requirement of the first device based on a value of the second attribute in the message;
   allocating a transcoding resource for the interactive multimedia session based on the signaling requirement; and
   providing the message to the second device.

2. The method of claim 1, wherein the message comprises a session description protocol (SDP) message.

3. The method of claim 1, wherein the value of the second attribute indicates that the first device requires Dual-Tone Multi-Frequency (DTMF) signaling.

4. The method of claim 3, wherein the first device requires in-band DTMF signaling and the second device requires out-of-band DTMF signaling.

5. The method of claim 4, further comprising transcoding, using the transcoding resource, in-band DTMF signaling into out-of-band DMTF signaling for the interactive multimedia session.

6. The method of claim 1, wherein the message is received at a session border controller.

7. The method of claim 1, wherein a value of the first attribute indicates that the first device supports Dual-Tone Multi-Frequency (DTMF) signaling.

8. The method of claim 1, wherein determining the signaling requirement of the first device based on the value of the second attribute in the message comprises determining the value of the second attribute in a media line attribute of a session description protocol message.

9. The method of claim 1, wherein the first device comprises an interactive voice system, and wherein the interactive multimedia session comprises a communication session with the interactive voice system.

10. A method comprising:
    receiving, from a first device, a message for initiating an interactive multimedia session between the first device and a second device, wherein the message comprises a first attribute indicative of an operational feature of the first device and a second attribute indicative of an operational requirement of the first device;
    determining absence of a signaling requirement of the first device based on a value of the second attribute in the message;
    determining to bypass allocation of a transcoding resource for the interactive multimedia session based on the absence of the signaling requirement; and
    providing the message to the second device.

11. The method of claim 10, wherein the message comprises a session description protocol (SDP) message.

12. The method of claim 10, wherein the value of the second attribute indicates that the first device does not require Dual-Tone Multi-Frequency (DTMF) signaling.

13. The method of claim 10, wherein the message is received at a session border controller.

14. The method of claim 10, wherein a value of the first attribute indicates that the first device supports Dual-Tone Multi-Frequency (DTMF) signaling.

15. The method of claim 10, wherein determining the signaling requirement of the first device based on the value of the second attribute in the message comprises determining the value of the second attribute in a media line attribute of a session description protocol (SDP) message.

16. The method of claim 10, further comprising:
    receiving, from a third device, a second message for initiating a second interactive multimedia session between the third device and the second device; and
    determining that the third device has the signaling requirement based on a second value of the second attribute in the second message; and
    allocating a transcoding resource for the second interactive multimedia session based on the signaling requirement.

17. The method of claim 16, wherein the third device comprises an interactive voice system, and wherein the second interactive multimedia session comprises a communication session with the interactive voice system.

18. An apparatus, comprising:
    one or more processors, and
    a memory having stored thereon processor executable instructions that, when executed by the one or more processors, cause the apparatus to:
      receive, from a first device in a first band, a communication request having a first attribute indicative of an operational feature of the first device and a second attribute indicative of an operational requirement of the first device; and
      allocate system resources according to the first attribute and the second attribute.

19. The apparatus of claim 18, wherein the communication request comprises a request to communicate with a second device in a second band.

20. The apparatus of claim 18, wherein the first attribute indicates whether the first device supports dual-tone multi-frequency (DTMF) signaling, and wherein the second attribute indicates whether the first device requires DTMF signaling.

* * * * *